US012791313B2

(12) United States Patent
Nørgaard et al.

(10) Patent No.: US 12,791,313 B2
(45) Date of Patent: Nov. 10, 2026

(54) METHOD AND DEVICE FOR GENERATING PHOTOGRAMMETRY DATA

(71) Applicant: Phase One A/S, Frederiksberg (DK)

(72) Inventors: Lau Nørgaard, Roskilde (DK); Thomas Andersen, Hårlev (DK); Poul Nørgård, Silkeborg (DK); Michael Ølund, Copenhagen Ø (DK)

(*) Notice: Subject to any disclaimer, the term of this patent is extended or adjusted under 35 U.S.C. 154(b) by 0 days.

(21) Appl. No.: 18/764,220

(22) Filed: Jul. 4, 2024

(65) Prior Publication Data

US 2025/0020462 A1 Jan. 16, 2025

(30) Foreign Application Priority Data

Jul. 12, 2023 (DK) ............................ PA202370379

(51) Int. Cl.
*G01C 11/08* (2006.01)

(52) U.S. Cl.
CPC .................................. *G01C 11/08* (2013.01)

(58) Field of Classification Search
CPC ..... G06T 17/00; G06T 2200/08; G06T 17/05; G01C 11/00
See application file for complete search history.

(56) References Cited

U.S. PATENT DOCUMENTS 6,757,445 B1 6/2004 Knopp
2008/0117288 A1* 5/2008 Park ......................... B60R 1/28 348/36
2010/0271505 A1* 10/2010 Zimmer ................ H04N 23/60 348/222.1
2015/0269785 A1 9/2015 Bell
2016/0191815 A1* 6/2016 Annau .............. G06Q 30/0263 348/38

(Continued)

FOREIGN PATENT DOCUMENTS

AU 2019201822 A1 10/2020
CN 110163962 A 8/2019

(Continued)

OTHER PUBLICATIONS

XP 32846966A—Punnappurath Abhijith et al.—Spatially Aware Metadata for Raw Reconstruction.

(Continued)

*Primary Examiner* — Emily C Terrell
*Assistant Examiner* — Jacqueline R Zak

(57) ABSTRACT

Geographical maps, orthomosaics, 2D/3D models and other photogrammetry products are typically generated from RGB image data. This requires a conversion step from the captured raw format image to RGB. Such conversion can result in image artifacts, blurring and reduction of image resolution, loss of dynamic range, increase in image data size etc. A method is disclosed to avoid conversion into standard RGB image formats at the time of capture and to preserve the full data integrity and image quality all the way through the photogrammetry workflow. Having the raw format image data available at all stages in the workflow will make it possible to extract exactly the data needed at any step in this workflow without compromising the data for other steps. This leads to significant savings in terms of storage space, data transfer bandwidth and processing resource requirements.

13 Claims, 3 Drawing Sheets

(56) References Cited

U.S. PATENT DOCUMENTS

| | | | | |
|---|---|---|---|---|
| 2017/0094169 | A1* | 3/2017 | Yoshikawa | G06T 3/4038 |
| 2019/0026938 | A1 | 1/2019 | Fuscoe | |
| 2019/0058870 | A1* | 2/2019 | Rowell | H04N 13/189 |
| 2019/0208181 | A1* | 7/2019 | Rowell | H04N 9/8205 |
| 2019/0339369 | A1* | 11/2019 | Fenton | G06T 7/001 |
| 2021/0097716 | A1* | 4/2021 | Lee | G06T 5/80 |
| 2021/0142497 | A1* | 5/2021 | Pugh | G06T 7/194 |
| 2022/0247889 | A1* | 8/2022 | Babiloni | H04N 9/646 |

FOREIGN PATENT DOCUMENTS

| | | | | |
|---|---|---|---|---|
| EP | 0895577 | B1 | 2/1992 | |
| EP | 3315005 | B1 * | 4/2022 | A01B 69/001 |
| FR | 3026208 | A1 * | 3/2016 | A61B 5/1034 |
| GB | 2544268 | A * | 5/2017 | G01B 11/245 |

OTHER PUBLICATIONS

XP 33926466A—Wen Amin et al.—Application of delta-wing airplane remote sensing system with dual-camera in mapping vegetation fraction.

* cited by examiner

METHOD AND DEVICE FOR GENERATING PHOTOGRAMMETRY DATA

BACKGROUND

The present disclosure relates to a method for operating an electronic device configured to generate a digital photogrammetry data and a related device.

The data captured with the image sensor in a digital camera is initially in the form of sensor specific "raw image data". This data does not constitute a standard image file, and it is therefore typically converted into a standard format image at the time of capture to ensure compatibility and interoperability with other parts of the imaging system and subsequent image data management and image processing workflows. This conversion normally takes place at the time of capture either in the camera's onboard processor or in software on a computer connected to the camera. During the conversion from a raw format image to a standard format image, some image quality is lost, and the integrity of the original data cannot be maintained—thus information is lost. As part of the conversion, several decisions are made regarding parameters for the conversion, these include decisions influencing the exposure, color, white balance, contrast, dynamic range, sharpening etc. The selected values for the conversion parameters influence the quality that can be obtained by image post-processing. If specific conversion parameters have been used in the conversion from raw to standard format image (for example conversion parameters related to white balance or exposure) and the post-processing tries to fundamentally correct the resulting values (for example impose a white balance assuming a different lighting or another exposure), significant degradation of data and image quality may occur. In a worst case, parts of the image may end up with pixel values outside of the dynamic range of the output file, and the original values or anything close cannot be recovered later.

Generating spatial models from images involves taking many, often hundreds or thousands, of images of a scene or an object from different relative positions and use photogrammetry in an automated image processing workflow to generate a spatial model with the desired information. Here, many raw format images are converted to a format that can be used in standard photogrammetry algorithms of the workflow, typically an RGB format where each pixel contains three values for Red, Green, and Blue to represent the colour in a standard colour space. Existing solutions such as US 2019/0208181 involve conversion from the initial raw format images to standard format RGB images early in the workflow, and then using these RGB images throughout the process of 3D model generation, including the determining of spatial coordinates and the generating surface texture and color. This can be either at the time of capture, in the camera or an attached host computer, or during a post-capture conversion process. In all cases the data being inspected, archived, and carried on for the succeeding image post-processing steps of the spatial model generation workflow are standard RGB image files.

SUMMARY

The prior art approach is disadvantageous since the early batch-conversion of raw format images and later photogrammetric image post-processing based on the standard format images often results in sub-optimal conversion parameters being used in the early batch-conversion. In addition, conversion from raw to RGB data results in a three to six time increase in data size resulting in significantly bigger image files and increasing the requirements for transfer bandwidth and storage space, incurring both logistical challenges and significant additional cost.

Accordingly, there is a need for devices and methods for operating an electronic device configured to generate spatial photogrammetry data or a digital spatial model, which mitigate, alleviate, or address the shortcomings existing and provide an increased performance of spatial model generation workflows by avoiding the compromises normally involved in raw format to standard format image conversion.

A method is disclosed, for operating an electronic device comprising a processor and an interface and being configured to generate spatial photogrammetry data. The method comprises accessing, via the interface and/or using the processor of the electronic device, digital raw format images captured from a plurality of different positions, such as different relative positions, and comprising metadata providing the capturing position and orientation. The method comprises processing, using the processor, the raw format images for generating spatial photogrammetry data. Processing the raw format images comprises generating, first ancillary format images from the raw format images using first sets of conversion parameters, such as first sets of conversion parameter values. Processing the raw format images comprises determining spatial coordinates by triangulation based on the generated first ancillary format images, such as by triangulation based on features extracted from the generated first ancillary format images. Processing the raw format images comprises generating second ancillary format images from the raw format images using second sets of conversion parameters, such as second sets of conversion parameter values, different from the first sets of conversion parameters. Processing the raw format images comprises generating surface color data based on the second ancillary format images. The electronic device may be configured to generate a digital spatial model by generating a digital spatial model based on the generated spatial photogrammetry data comprising the spatial coordinates and the surface color data. The order of the steps of generating first ancillary format images, determining spatial coordinates, generating second ancillary format images, and generating surface color data is not fixed and may be varied to the extent that the data required to perform a given step is available.

In an embodiment, the method relates to geomatics. In this embodiment, generating spatial photogrammetry data may comprise generating geospatial photogrammetry data, wherein determined spatial coordinates are geospatial coordinates, and wherein the triangulation is aero triangulation. Also, the digital spatial model may be a digital geomatic model.

Further, an image processing device is provided, the device comprising memory circuitry, processor circuitry, and an interface, wherein the image processing device is configured to perform any of the operations of the method for generating spatial photogrammetry data disclosed herein.

In the present disclosure, a digital spatial model is a digital representation of a real-world scene or object that contains more information than a single image of the scene or object. A spatial model may be a 2D map or a 3D model. In the present disclosure, the digital spatial model is represented by the generated spatial photogrammetry data comprising the spatial coordinates defining a shape of the model and the surface color data applying color or texture to the shape.

In the present disclosure, surface color data is used to apply color or texture to the shape defined by the spatial coordinates. Such surface color data may be, but is not limited to texture-map images, orthoimages, colorized point cloud data, colorized vertices, colorized polygons, other radiometric or color data. In some instances, the values of the surface color data may represent a texture instead of a color.

In the present disclosure, a raw format image comprises unprocessed or minimally processed image data from the image sensor of a digital camera or other digital imaging device. The data of a raw format image has not been processed to turn it into standard format image data suitable for viewing, editing, printing or analysis. There are many raw formats in use by different manufacturers of digital image capture equipment.

The first and second (and further) ancillary format images are digital images in a standardized format, meaning image data processed to comply to a standard that (possibly with some meta data) enables any image processing software to read the data and render it as it is intended to look. In the present description, the term 'standard format image' is used to jointly refer to all the different (first, second, third . . . ) ancillary format images. Some common standard formats are BMP (Bitmap Image File), JPEG (Joint Photographic Experts Group), PNG (Portable Network Graphics), GIF (Graphics Interchange Format), TIFF (Tagged Image File), GeoTIFF and other raster image formats dedicated to GIS, and various vendor/application specific raster file formats. The standard formats used in the present disclosure are preferably formats used in standard photogrammetry algorithms and software.

It is an advantage of the present disclosure that each conversion from raw format images to standard format images can be performed using an improved selection of conversion parameters.

Since the second sets of conversion parameters are different from the first sets of conversion parameters, in that either the type of conversion parameters and/or the conversion parameter values are different, the selection of the first and second sets of conversion parameters may be improved by being specific to and/or optimized for the succeeding post-processing step utilizing the standard format images generated in the conversion. Selecting conversion parameters that are specific to or optimized for the succeeding post-processing step is advantageous since it can reduce the computationally expensive image processing steps involved in the conversion and reduce the file size of the resulting standard format image. As an example, if a succeeding post-processing step requires only grey-scale image data, the conversion from the raw format image to a grey-scale standard format image requires less memory, processing time, and power than conversion first converting to a large standard format RGB image and then converting that into a grey-scale standard format image before performing the actual post processing.

The selection of conversion parameters may be improved by utilizing data generated previously in the spatial model generation workflow. This implies that the order of the steps in the workflow may be constrained.

In an embodiment, for a given raw format image, the steps of generating the first ancillary format image and determining spatial coordinates based thereon are performed before the step of generating the second ancillary format image from that raw format image.

In an embodiment, for a given raw format image, the steps of generating the first ancillary format image and determining spatial coordinates based thereon are performed before the step of generating a first ancillary format image from a subsequent raw format image.

In an embodiment, the steps of generating the first ancillary format images and determining spatial coordinates are performed for all raw format images before the steps of generating the second ancillary format images from the raw format images.

The feature that a standard format image to be utilized in a first post-processing step may be generated immediately before the first post-processing step—or in other words that the post-processing step may be performed on the generated standard format image before generating subsequent standard format images for subsequent post-processing steps—has the effect that generated standard format images need not be stored in a long-term storage. Rather, the generated standard format images may be temporarily stored in short-term memory such as primary memory or Random Access Memory (RAM), which may be overwritten by subsequently generated standard format images after the post-processing of the current standard format image. This has the effect of reducing the required storage capacity and transfer bandwidth and increasing processing speed since less data need to be sent to and retrieved from storage.

It is an advantage of the present disclosure that the standard format images may be generated when they are needed and that they may be deleted immediately after use. This avoids an early conversion from raw format images to standard format images that would result in two or more copies of all images that will have to be managed, backed up etc. resulting in both logistical challenges and very significant cost of storage.

The selection of conversion parameters may be improved by utilizing data generated previously in the photogrammetric data generation workflow.

In an embodiment, the second sets of conversion parameters used to generate second ancillary format images are determined utilizing photogrammetry data generated using the first ancillary format images, such as utilizing the determined spatial coordinates.

The selection of second sets of conversion parameters may be improved by selecting varying conversion parameters for different images to improve continuity of one or more image metrics between the generated surface color data.

The improved selection of conversion parameters can thereby result in reduced loss of dynamic range in the conversion and reduced image quality deterioration from interpolation, color or exposure corrections or other post processing steps that would otherwise have to be performed on the ancillary format images after the conversion from RAW format images.

It is an advantage of the present disclosure that image data is maintained in the more storage space efficient raw format through the spatial model generation workflow, thereby gaining significant savings in required transfer bandwidth and storage space requirements.

It is an advantage of the present disclosure that image data is maintained in the raw format through the spatial model generation workflow, thereby avoiding any permanent loss of image data resulting from a conversion of raw format images into standard format images and subsequent deletion of the raw format images.

In the prior art, it is common to perform a batch conversion at the start of or prior to the spatial model generation workflow, using a set of multi-purpose conversion parameters that aims at generating large standard format images applicable in all the different image post-processing steps of the post-processing workflow for generating photogrammetry data and/or a digital spatial model generation, such as feature extraction, feature matching, triangulation, orthophoto generation, spatial model generation, texture generation, spatial model delighting, etc. The present disclosure proposes generating different standard format images specifically for different image post-processing steps of the spatial model generation workflow. These different standard format images may be generated using sets of conversion parameters that are specific to the image post-processing step and/or selected based on data generated previously in the spatial model generation workflow.

By enabling the original raw format image to be carried and used all the way through the spatial model generation workflow, at any point in the workflow numerical calculations, image processing, image rendering, photogrammetry etc. can be traced back to the original uncompromised raw format image as captured, instead of to a compromised standard format image. By storing the sets of conversion parameters used for generating different standard format images for each raw format image, the same or adjusted standard format images may easily be (re)generated from a raw format image at later times.

BRIEF DESCRIPTION OF DRAWINGS

The above and other features and advantages of the present disclosure will become readily apparent to those skilled in the art by the following detailed description of example embodiments thereof with reference to the attached drawings, in which.

DETAILED DESCRIPTION

Figure 1:
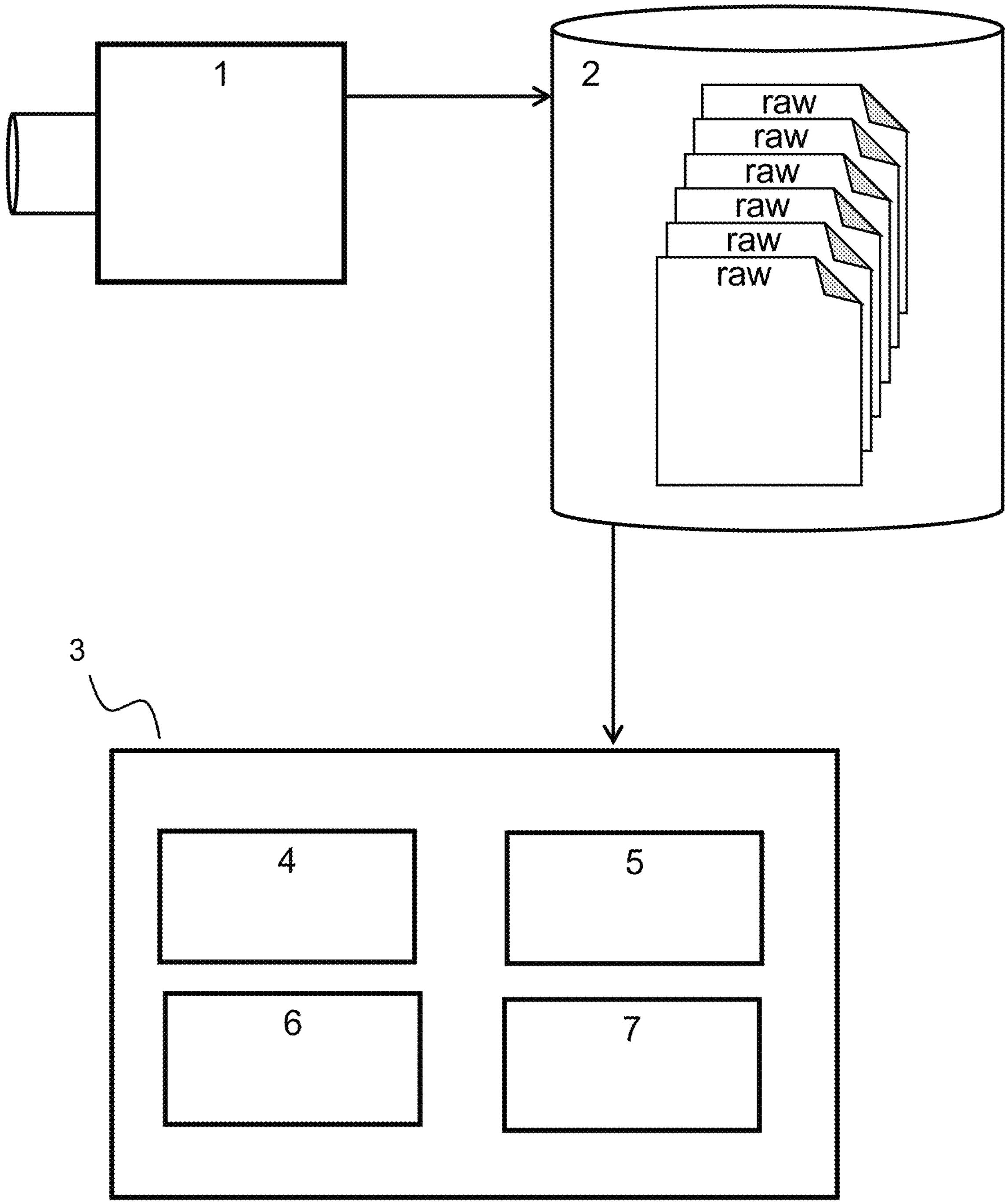
FIG. 1 is a diagram illustrating a camera, a storage, and an example image processing device according to this disclosure.

At least one specification heading is required. Please delete this heading section if it is not applicable to your application. For more information regarding the headings of the specification, please see MPEP 608.01(a).

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

As mentioned previously, a raw format image comprises unprocessed or minimally processed image data from the image sensor of a digital camera or other digital imaging device. The raw format is typically specific to the manufacturer of the digital image capture equipment used to capture the image and the data has not been processed to turn it into a standard format suitable for viewing, editing, printing or analysis. In contrast, the first and second (and further) ancillary format images, jointly referred to as standard format images, are digital images in a standardized format enabling any image processing software to read the data and render it as it is intended to look. The following provides more context to the differences between raw format images and standard format images.

The term raw format image is used to refer to both the light intensity data from the photosites of the image sensor and the additional meta data belonging to the same image. If a raw format image is stored in a file in a file system, it can be referred to as a raw image file. Raw image file is also often used to refer to a raw format image with its the collection of raw image data and meta data, even if it is not stored in a file system but kept in for example a memory buffer, stored in a database or other data structure. The image data itself contained within a raw format image is referred to as raw image data or raw format image data.

While raw format images are typically processed to correct for sensor-specific issues such as image sensor blemishes, black current non uniformity, or similar issues, the raw format image data contained in a raw format image has not been processed into a format conforming to a standard image data specification. It will typically be in the native format of the image sensor device regarding pixel layout, dynamic range, color space, bit depth etc. A raw format image file contains the original data as captured by the image sensor device at the time of capture. It is in principle a recording of the amount of light that was detected by each photo site on the imaging device. A fundamental difference between standard image formats and raw image formats is that the former is intended to allow software to render the images accurately on a display or other output and the latter are intended to faithfully store the data collected at the time of capture.

Standard format images (e.g., with formats such as JPEG, TIFF, PNG etc.) are intended for rendering or display purpose and as such contain the image data in a standardized format suitable for this and the necessary meta data to display it correctly without requiring any information about how the image was originally created or captured. Therefore, such standard image formats are also sometimes referred to as viewable file formats.

A raw image file contains the raw image sensor data and additional meta data necessary to understand this data. Color image sensors typically have a Color Filter Array (CFA) in front of the pixel array so that individual pixels only detect light in a limited range of wavelengths and the captured pixel values can subsequently be used generate color image data. As the raw format image data is unprocessed or very minimally processed sensor data, the captured pixel values are not yet converted to any specific standard color space.

The differences may be summarized as follows:

Standard Image Format:

Concerned with storing an image and how to display it correctly.

typically contain image data and meta data in a format intended to enable software to understand what it should look like and to display it easily and effectively.

Pixel data stored in a standard data format e.g., as RGB with a red, green, and blue value for each pixel.

Pixel data is typically in a well-defined standard color space. This specifies how the red, green, and blue values should be interpreted to display or print the colors as intended.

To display the image correctly, only knowhow about how to display images is needed. No need for any knowledge about how the image was created.

Pixel data has typically gone through a significant amount of image processing to turn it into the standard image format. So, it can no longer be referred directly back to the physical process involved in capturing the image data.

Raw Image Format:

Concerned with storing image sensor data and how to interpret it into an image format based on how it was captured.

Contains the image data as it was captured by the image sensor device.

Contains additional metadata about how the image data was captured and about the capture system enabling software to understand the capture device and the scene at the time of capture.

Raw image data is in principle a radiometric recording of the amount of light received by the image sensor at the time of capture. With the additional meta data about the sensor device, optical system, and exposure parameters it is possible to calculate what the scene in front of the camera looked like at the time of capture.

Raw image data contains all the information as captured at the time of image capture. No degradation of data integrity resulting from processing the image data to conform to a standard format.

FIG. 1 is a block diagram illustrating an example image processing device 3 according to this disclosure together with an exemplary raw image capture capable camera 1 for capturing images and a storage 2 for receiving and storing the captured images as raw format images.

As discussed in detail herein, the present disclosure relates to determining photogrammetric data for generation of a digital spatial model of an object or a scene, such as a digital terrain model of a landscape based on digital images thereof. The images are captured by one or more cameras 1 from a plurality of different relative positions and comprises metadata providing the capturing position and orientation. Capturing from different positions may be achieved by having one or multiple cameras 1 mounted on a movable capture platform such as on a manned or unmanned aircraft (plane, helicopter, UAV . . . ), a ground vehicle, an autonomous underwater vehicle (AUV), a capture rig to be carried by a person, a sled, a robot arm etc., by having the camera stationary and moving (translation and/or rotation) the object or scene, or by any combination of these.

The image data captured with the image sensors in the camera(s) is stored as raw image files on storage 2 which may be either on-board storage in the camera(s) 1, removable storage medium in the camera(s) 1, storage in a computer or other controller attached to the camera(s) 1, an attached external storage medium attached to the camera(s) 1 or to the image processing device 3, or a remote storage e.g. cloud or server storage, accessible by the image processing device 3.

The metadata providing the capturing position and orientation can be generated by sensors (accelerometer, GPS . . . ) in the camera or provided by an external sensor connected to the capture platform, or via a plan for the relative movement and capturing times and/or positions. Additional data from the image sensor, other sensors, connected devices or other components of the system can also be captured at or close to the time of image capture. This includes but is not limited to: Black image for black level correction captured by closing a mechanical shutter or other shielding mechanism shielding the image sensor from light, temperature of the image sensor and other parts of the system, information from optical systems e.g. focusing distance, precise measurements of aperture and shutter speed, information about the environment e.g. illumination, information about the physical properties if the image sensor and optical system e.g. noise characteristics, optical distortion parameters, color filter array layout, spectral sensitivity etc.

The Image sensor data together with metadata is packaged in a raw file containing all data needed to get the most out of the image, such as exposure meta data, calibration data, application specific meta data, system diagnostics data. If applicable the raw format image data can be compressed with lossless compression or with other compression that does compromise its full quality and value of the data in context of the intended use.

The example image processing device 3 shown in the block diagram of FIG. 1 comprises short-term memory circuitry 4, processor circuitry 5, interface 6 and long-term storage 7. The image processing device 3 may be configured to perform any of the methods and operations disclosed hereinafter in relation to FIG. 2 or elsewhere herein. In other words, the image processing device 3 may be configured determining photogrammetric data for generation of a digital spatial model of an object or a scene. As is well understood by the skilled person, the long-term storage 7 may comprise or be linked to the storage 2 so that the raw format images are directly accessible in the image processing device 3 or the image processing device 3 is configured to communicate with the storage 2 via interface 6 to access the plurality of raw format images. The image processing device 3 may be configured to communicate, via interface 6, the generated photogrammetric data and a generated digital spatial model to a user or another connected device such as an output device like a display or a printer.

Figure 2:
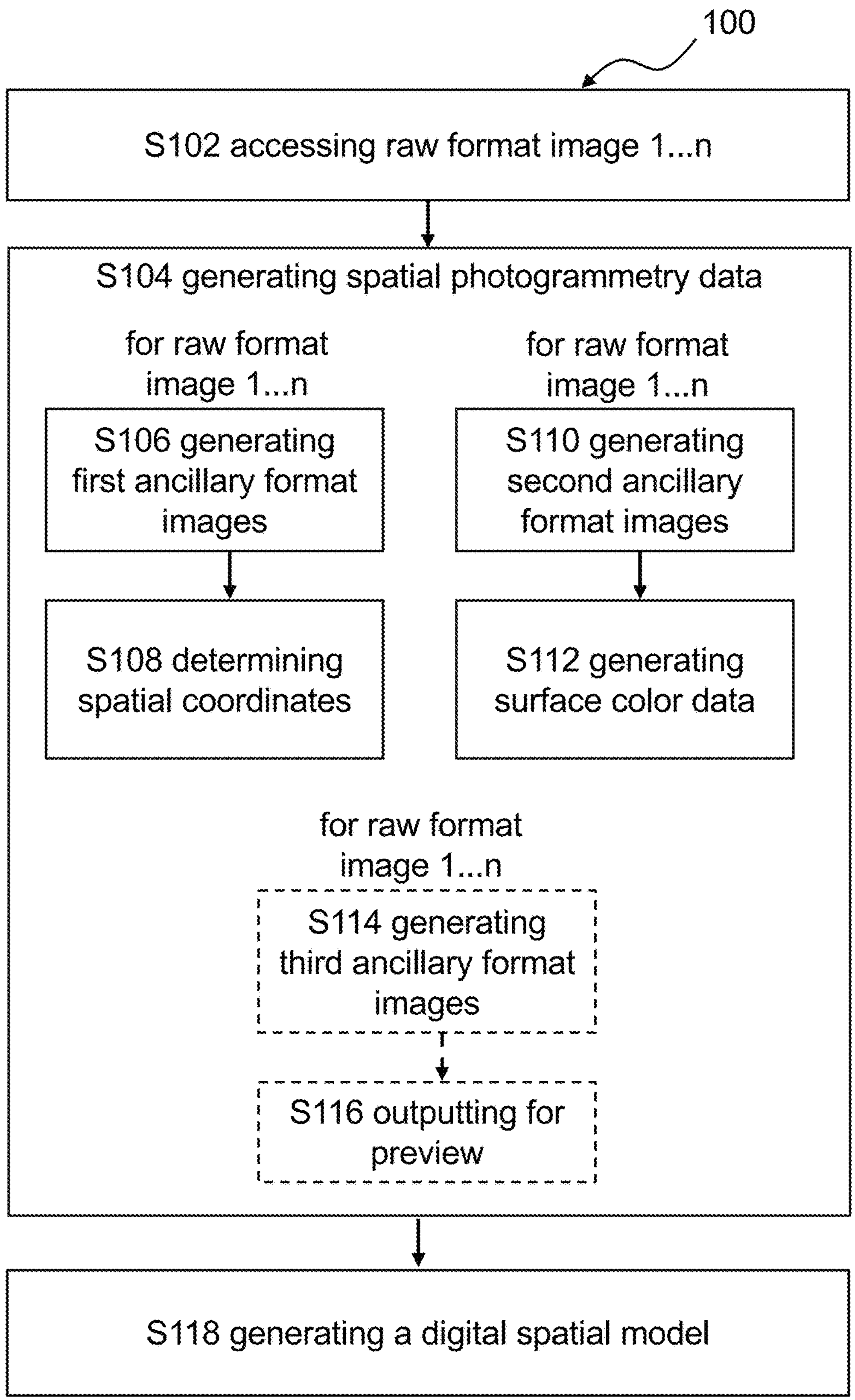
FIG. 2 is a flow-chart illustrating an example method, performed in an electronic device, for operating an electronic device configured to generate a digital spatial model according to this disclosure.

Processor circuitry 5 is optionally configured to perform any of the operations or steps disclosed in FIG. 2. The operations of the image processing device 3 may be embodied in the form of executable logic routines (for example, lines of code, software programs, etc.) that are stored on a non-transitory computer readable medium (for example, storage 7) and are executed by processor circuitry 5). Furthermore, the operations of the image processing device 3 may be considered a method that the image processing device 3 is configured to carry out. Also, while the described functions and operations may be implemented in software, such functionality may as well be carried out via dedicated hardware or firmware, or some combination of hardware, firmware and/or software.

General Workflow

FIG. 2 shows a flow diagram of an example method 100 of operating an image processing device 3 (shown in FIG. 1) configured to generate spatial photogrammetry data according to the disclosure. The method 100 comprises accessing S102, via interface 6 and/or using processor 5 of the image processing device 3, digital raw format images captured from a plurality of different relative positions and comprising metadata providing the capturing position and orientation. As discussed previously, the raw format images may be stored on a storage 2 that may be internal to the image processing device or external to the image processing device 3 and accessible via interface 6, see FIG. 1.

The method comprises processing S104, using the processor 5, the raw format images for generating spatial photogrammetry data. For easier reference, the following notation is used in the following. The number of raw images to be processed is referred to as ‘n’. The index ‘i’ is used to refer to the currently processed raw format image and the data generated therefrom, i.e., ‘raw format image i’, ‘first ancillary format image i’, ‘second conversion parameter set i’ etc. More than n raw format images may have been captured and stored, but some may not be processed due to quality issues, redundancy, etc. In a preferred embodiment, the method comprises, prior to generating photogrammetry data, evaluating the raw format images, comprising evaluating preview images or one or more metadata values, or creating metrics directly from the raw image data or from a subset of the raw image data for the captured images to identify images eligible for processing.

In the present disclosure, the spatial photogrammetry data involves the spatial coordinates resulting from triangulation and the surface colour data. Thus, spatial photogrammetry data may comprise data such as digital terrain models, 3D models, point clouds, image information layer containing colour or radiometric data such as texture maps, ortho images, spatially referenced images, coloured point cloud data etc.

Processing the raw format images comprises generating S106, first ancillary format images from the raw format images using first sets of conversion parameters, such as a first set of conversion parameter values. The first conversion parameter set used to generate first ancillary format image i may be the same for all first ancillary format images or may be specific to first ancillary format image i. The used first conversion parameter sets are preferably stored for later reference. The generated first ancillary format image are preferably saved in the short-term memory 4 of the image processing device 3, such as only saved temporarily and only saved in the short-term memory 4.

Processing the raw format images also comprises determining spatial coordinates S108 by triangulation based on the generated first ancillary format images, where triangulation refers to the process of determining a point in space given its projections onto two or more images. The determined spatial coordinates are stored (not shown) for use in the digital spatial model generation. In an exemplary embodiment, determining spatial coordinates comprises performing feature extraction for a selection of, or all, first ancillary format images to determine image level features and corresponding coordinates. The triangulation can then be performed utilizing the coordinates corresponding to the extracted image level features. After feature extraction, the image level features, and their corresponding coordinates are preferably stored for use in triangulation as well as for later reference and the first ancillary format images may be deleted. In some scenarios it may be possible to perform triangulation based on the generated first ancillary format images by utilizing e.g., metadata related to camera position and orientation and other settings, i.e., without performing feature extraction.

The first ancillary format images are generally much larger than the raw format images. In an exemplary embodiment, after image level features for image i have been determined, first ancillary format image i is deleted. Hence, in an exemplary embodiment, first ancillary format image i is only temporarily saved in short-term memory 4 during extraction of image level features i. In other words, first ancillary format image i is preferably saved in memory circuitry that is being re-used, for example for subsequently generated first and second ancillary format images. In other words, after determining image level features i, first ancillary format image i is preferably deleted or overwritten so as not to take up long-term storage space. Any first ancillary format image i may be re-generated at any later time using raw format image i and first conversion parameter set i. When image level features have been extracted for all first ancillary images, these features can be used for spatial triangulation to generate spatial coordinates.

Processing the raw format images comprises generating S110 second ancillary format images from the raw format images using second sets of conversion parameters, such as a second set of conversion parameter values, different from the first sets of conversion parameters in that either the type of conversion parameters and/or the conversion parameter values are different. The second conversion parameter set used to generate second ancillary format image i may be the same for all second ancillary format images or may be specific to second ancillary format image i. The used second conversion parameter sets are preferably stored for later reference. The generated second ancillary format image are preferably saved in the short-term memory 4 of the image processing device 3, such as only saved temporarily and only saved in the short-term memory 4.

Processing the raw format images comprises generating S112 surface color data such as texture-map images, ortho-images and/or other types of color or radiometric data for the photogrammetric model based on the second ancillary format images. The generated surface color data is stored (not shown).

The second ancillary format images are generally much larger than the raw format images. In an exemplary embodiment, after surface color data i has been generated, second ancillary format image i is deleted. Hence, in an exemplary embodiment, second ancillary format image i is only temporarily saved in short-term memory 4 during generation of surface color data i. In other words, second ancillary format image i is preferably stored on memory that is being re-used, for example for subsequently generated first and second ancillary format images. In other words, after generating surface color data i, second ancillary format image i is preferably deleted or overwritten so as not to take up long-term storage space. Any second ancillary format image i may be re-generated at any later time using raw format image i and second conversion parameter set i.

For quality control or other intermediate management tasks, image inspection can be done directly based on the raw format image data. This can utilize the raw format image data, embedded previews, and the included meta data to verify that the images have been captured as planned and that they are of the desired quality and captured within the desired parameters. For such purposes, as well as for visual quality control and preview, viewable format images, such as temporary RGB images, may be generated from the raw format images using conversion parameters suitable to optimize the review process. Thus, in an exemplary embodiment, processing the raw format images comprises generating S114 third ancillary format images from the raw format image using a third sets of conversion parameters different from the first and second sets of conversion parameters. The third sets of conversion parameters are preferably selected to generate third ancillary format images having a file size smaller than 1/100 of the corresponding raw format images. In this exemplary embodiment, processing the raw format images comprises outputting S116 the third ancillary format images for preview, such as on a display. The third ancillary format images can be used to get a quick overview of the content of the images e.g., for project and data management, initial overview generation and for creating a first quick version of maps, models etc. Third ancillary format images can be created at any point in the workflow e.g.; during the image capture process, before generating first ancillary format images or during processing or managing of first or second ancillary images.

The electronic device may be configured to generate S118 a digital spatial model by comprising generating a digital spatial model based on the generated spatial photogrammetry data comprising the spatial coordinates and the surface color data.

The order of the operations S106, S108, S110 and S112 for each of the plurality of raw format images is constrained in that an ancillary format image must be generated before it can be further processed.

As discussed previously, generated first and second ancillary format images take of a lot of storage space which is preferably reused by subsequent first or second ancillary format images. However, generated first or second ancillary format image should not be deleted or overwritten until the corresponding image level features or spatial coordinates have been determined, or surface color data has been generated based thereon.

As also discussed previously, order of the steps of generating first ancillary format images, determining spatial coordinates, generating second ancillary format images, and generating surface color data is not fixed and may be varied to the extent that the data required to perform a step is available. The following serves to introduce a compact notation and present different permutations of the order in which steps, here referred to as operations, may be formed:

If operations S106, S108, S110 and S112 are denoted as:

generating (S106) first ancillary format images from the raw format images using first sets of conversion parameters;

determining (S108) image level features and/or spatial coordinates based on the generated first ancillary format images;

generating (S110) second ancillary format images from the raw format images using second sets of conversion parameters; and generating (S112) surface color data based on the second ancillary format images;

The following notation is used: 'a (i)' indicates operation 'a' performed for raw format image 'i'. ';' is used to separate operations performed after each other, square brackets '[ ]' indicates operations performed together before proceeding, and subscript '1-n' indicates performing the operation(s) for all images (i=1 . . . n) before proceeding.

Each one of the following permutations of the operations is possible:

$[a\ (i);\ b\ (i)]_{1\text{-}n};\ [c\ (i);\ d\ (i)]_{1\text{-}n}$ $[c\ (i);\ d\ (i)]_{1\text{-}n};\ [a\ (i);\ b\ (i)]_{1\text{-}n}$ $[a\ (i);\ b\ (i);\ c\ (i);\ d\ (i)]_{1\text{-}n}$ $[a\ (i);\ c\ (i);\ b\ (i);\ d\ (i)]_{1\text{-}n}$ $[a\ (i);\ c\ (i);\ d\ (i);\ b\ (i)]_{1\text{-}n}$ $[c\ (i);\ d\ (i);\ a\ (i);\ b\ (i)]_{1\text{-}n}$.

$[c\ (i);\ a\ (i);\ d\ (i);\ d\ (i)]_{1\text{-}n}$ $[c\ (i);\ a\ (i);\ d\ (i);\ b\ (i)]_{1\text{-}n}$ If c(i) precedes b(i), it follows that the second sets of conversion parameters used in c(i) cannot use the spatial coordinates determined for image i in step b(i). Therefore, in an exemplary embodiment, for each raw format image, the steps of generating the first ancillary format image from the raw format image and determining spatial coordinates are performed before the step of generating the second ancillary format image from the raw format image. With the above notation, this implies that b(i) precedes c(i).

In an exemplary embodiment, for a given raw format image, the steps of generating the first ancillary format image from said raw format image and determining spatial coordinates based thereon are performed before the step pf generating a first ancillary format image from a subsequent raw format image. With the above notation, this implies that b(i) precedes a (i+1).

In an exemplary embodiment, the steps of generating the first ancillary format images from the raw format images and determining spatial coordinates are performed for all raw format images before the steps of generating the second ancillary format images from the raw format images. With the above notation, this implies that $[a\ (i);\ b\ (i)]_{1\text{-}n}$ or $a\ (i)_{1\text{-}n};\ b\ (i)_{1\text{-}n}$ precedes b(i).

According to the disclosure, the first sets of conversion parameters are different from the second sets of conversion parameters in that either the type of conversion parameters and/or the conversion parameter values are different. Thereby the generated ancillary format image data can be optimized for specific steps in the photogrammetry workflow. For example, data can be generated independently and with separate parameters for determining spatial coordinates by triangulation and for generating surface color data. For the determination of spatial coordinates by triangulation, first ancillary format image data can be generated from raw format image data with first conversion parameters optimized for enhancing local contrast and details and compressing overall dynamic range. This data can be generated using algorithms to brighten shadows and darken highlights while preserving detail information in both. This way local contrast and details needed for the feature matching between images during triangulation can perform better even in very high contrast situations without the need for high bit depth image data. As the first ancillary format image data is preferably only used to generate the geometry of the product (such as spatial coordinates of a terrain model, point cloud, mesh model or height map) and not also used for colorization or texture generation, it can be optimized solely for this purpose with no need for the images to "look good". As triangulation typically is performed on monochrome image data, the first sets of conversion parameters are, in an exemplary embodiment, selected to generate monochrome 8 bit data from the raw format image data.

For the generation of surface color data, second ancillary format image data can be generated from raw format image data with second conversion parameters optimized for generating high visual quality with accurate color reproduction. As this data is generated independently from the first ancillary format image data for triangulation, it does not have to be optimal for feature matching and therefore can be generated with different priorities, e.g., more noise suppression. To facilitate better handling of the high dynamic range between deep shadows and bright highlights, the second sets of conversion parameters are, in an exemplary embodiment, selected to generate 16 bit RGB data from the raw format image data. This will provide good visual quality across the image and across both shadows and highlights. This is advantageous as textures will typically be de-lighted by removing the light and shadows to create a model that can later be rendered with different lighting. The de-lighting process benefits from very high data and color quality across the images regardless of the local illumination. In many applications, generation of surface color data will not require image data in the same resolution as the triangulation. The image data for this step can therefore be generated from the raw format image data in a lower resolution to save processor, memory, bandwidth, and storage resources.

These considerations lead to several embodiments related to how to select the first and second sets of conversion parameters differently.

In an exemplary embodiment, the first and second sets of conversion parameters are selected for the first ancillary format images to be generated with a higher resolution than the second ancillary format images.

In an exemplary embodiment, the first and second sets of conversion parameters are selected for the first ancillary format images to be generated with a lower bit depth than the second ancillary format images.

In an exemplary embodiment, the first and second sets of conversion parameters are selected for the first ancillary format images to be generated with a lower noise suppression than the second ancillary format images.

In an exemplary embodiment, the first sets of conversion parameters are selected to enhance local contrast and details and compress overall dynamic range.

In an exemplary embodiment, the second sets of conversion parameters are selected to enhance color reproduction and increase dynamic range.

In an exemplary embodiment, the first and second sets of conversion parameters differs on one or more of the following parameters: Bit depth, pixel format e.g., monochrome/RGB, noise suppression, dynamic range compression, image resolution, image quality vs speed of processing setting.

When generating maps or models of larger areas or objects there can be significant variation from image to image in terms of exposure or color. This can be caused by the lighting conditions changing during the capture process e.g., sunlight changing during the day, changes to the orientation of the camera in relation to the scene and light source(s) or it can be caused by exposure variations caused by the camera, lens, or other parts of the capture system. Even minor variations can be visually very apparent when images are projected onto a map or 3D model. Based on metrics calculated from the image data in the individual images or from meta data in the image files collected at or near the time of capture, these variations can be removed or compensated for by calculating compensation parameters. These compensation parameters can either be calculated to adjust the individual images to an absolute reference or by comparing metrics from neighboring images to create a set of parameters to match images to each other and create smooth transitions over larger areas. Hence, in addition to using conversion parameter sets specific to triangulation or generation of surface color data, additional optimization can be done by adjusting conversion parameter values for individual images based on the image data itself, on meta data in the image file, data about the physical properties and relation between the camera, object and light source(s) at the time of capture, or other data available at the time of processing, such as Information about surrounding images, parameters extracted from image data of current or surrounding images (e.g. exposure, color, etc.), diagnostics data (e.g. measurements from mechanical shutter or aperture mechanisms made during capture to compensate for variations), information from the process of determining spatial coordinates, etc.

The compensation parameters calculated per image can be combined with, or used to adjust, the different first and second conversion parameter sets already specific to different steps in the generations of photogrammetric data, namely the triangulation or generation of surface color data. Thus, in an exemplary embodiment, first ancillary format images are generated using first sets of conversion parameter values that are different for different raw format images, and/or second ancillary format images are generated using second sets of conversion parameter values that are different for different raw format images. This is also referred to as 'per-image' generation, since each ancillary format image is generated using a conversion parameter set that is specific to that image. This can create conversion parameter sets that when used for the raw format image conversion result in images that are in one step both optimized for the specific point in the processing pipeline and are compensated for image-to-image variations and/or matched to neighboring images regarding e.g., exposure and color.

Figure 3:
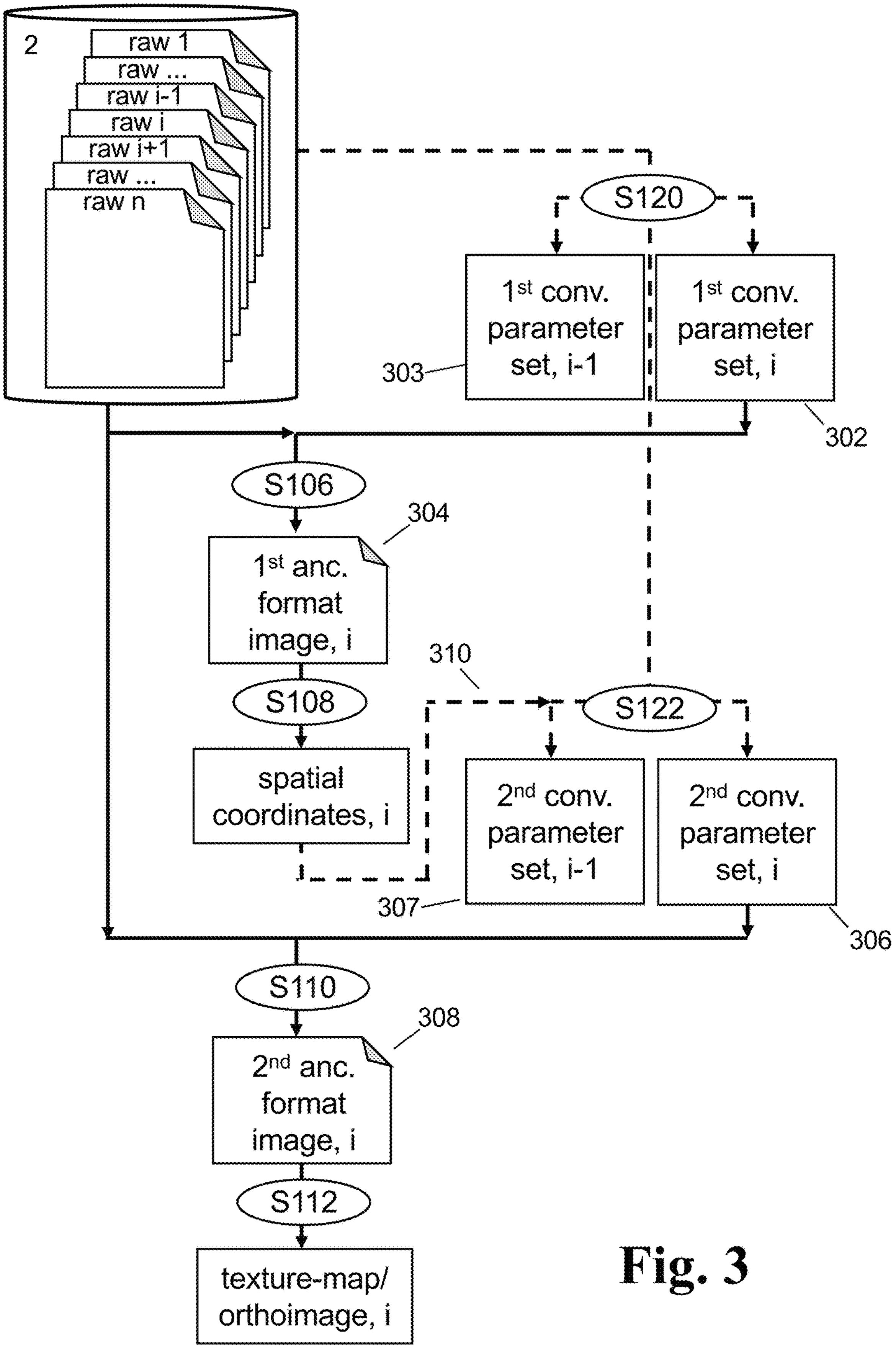
FIG. 3 is a diagram illustrating embodiments of an example method, performed in an electronic device, for operating an electronic device configured to generate a digital spatial model according to this disclosure.

These considerations lead to several embodiments related to how to select per-image sets for the first and second sets of conversion parameters, some of which are illustrated in FIG. 3.

In an exemplary embodiment, processing the raw format images comprises generating first ancillary format images from the raw format images using first sets of conversion parameter values that are different for different raw format images. This is illustrated by the first conversion parameter set i 302 which is specific to the generation of first ancillary format image i 304 in FIG. 3. The different first sets of conversion parameters 302 and 303 may differ on one or more of the following parameters:

- exposure compensation;
- image cropping (to avoid using processing and storage resources for image data already known to fall outside the area of interest).

The different first sets of conversion parameters 302 and 303 may be generated based on image data or metadata from the corresponding raw format images. This is illustrated by operation S120 in FIG. 3.

In an exemplary embodiment, processing the raw format images comprises generating second ancillary format images from the raw format images using second sets of conversion parameter values that are different for different raw format images. This is illustrated by the second conversion parameter sets 306 which is specific to the generation of second ancillary format image i 308 in FIG. 3. In an exemplary embodiment, the different second sets of conversion parameters used to generate second ancillary format images from different raw format images are determined based on photogrammetry data from the first ancillary format images generated from the corresponding raw format images. This is illustrated by the arrow 310 in FIG. 3. In other words, generating second ancillary format images applicable for surface color data generation may comprise using photogrammetry data generated based on first ancillary image data to determine per-image parameters for the second sets of conversion parameters to generate the second ancillary format images from the raw format images. In an exemplary embodiment, the different second sets of conversion parameters 306 and 307 may be generated based on image data or metadata from the corresponding raw format images. This is illustrated by operation S122 in FIG. 3.

In an exemplary embodiment, the different second sets of conversion parameters are generated based on a combination of photogrammetry data from the first ancillary format images and image data from the corresponding raw format images.

Image used in spatial model generation are originally captured so that there are areas of the scene or object that are captured by two or more images. Two or more images that have all captured the same area are said to have overlapping regions. Images having overlapping regions can be spatially matched—i.e., being positioned so that the overlapping regions match—using e.g., coordinates provided or determined for the images. When generating surface color data, image metrics such as brightness, colour, contrast, etc, for images with overlapping regions are adjusted to ensure smooth transitions. In the prior art, this adjustment of image metrics is performed based on the already generated RGB format images.

In the various embodiments described above, the different second sets of conversion parameter values 306 and 307 used to generate second ancillary format images from different raw format images may differ on one or more of the following parameters:

- exposure compensation;
- white balance;
- color correction;
- contrast;
- curves;
- image cropping (to avoid using processing and storage resources for image data already known to fall outside the area of interest).

In the present disclosure, the determination of per-image second sets of conversion parameter values may be aimed at optimising image-metric transitions between neighbouring images and/or over an area covered by images that have overlapping regions. This provides the advantage of making the surface colour data (more) continuous over the digital spatial model. Hence, in exemplary embodiments, selection of per-image second sets of conversion parameter values may be improved by selecting conversion parameters for different images to improve continuity of one or more image metrics between the generated surface color data.

In an exemplary embodiment, generating (per-image) second ancillary format images comprises:

- selecting a subset of raw format images that have overlapping regions; and
- determining second sets of conversion parameter values for the selected subset so that differences in one or more image metrics in corresponding overlapping regions of the second ancillary format images generated from the subset are smaller than a given threshold or minimized over the subset.

Determining second sets of conversion parameter values for images that have overlapping regions may include fitting image metrics across an image so that its values math that of surrounding images at their overlap. For example, a conversion parameter related to exposure compensation need not have the same value across an image but may have a different value in each corner or edge of the image to better match surrounding images. The parameter values across the image between the corners/edges may then be interpolated to avoid any abrupt changes. Hence, given parameter values at corners and/or edges, parameter values may be fitted across the image, for example using a 2D polynomial. In. other words, the second set of conversion parameters specify conversion from raw image format to second ancillary image format so that the conversion characteristics are non-uniform across the image. For example, second parameter values can specify a conversion that vary across the image area according to linear, polynomial, or other functions to enable better adjustments between all neighboring images. Hence, in an exemplary embodiment, generating (per-image) second ancillary format images comprises,

- selecting a subset of raw format images that have overlapping regions; and
- for a second ancillary format images generated from the subset and in which an image metric is (such as selected or adjusted to be) different in separate overlapping regions, determining values of a conversion parameter related to the image metric comprises fitting the values across the image to a continuous function connecting the different image metrics in the separate overlapping regions. The continuous function my e.g., be a polynomial curve ($1^{st}$, $2^{nd}$, $3^{rd}$, . . . order), and the fitting may include fitting to selected or prominent point in the non-overlapping regions of the image.

The image metrics relied upon in the determination of the per-image second conversion parameter sets comprise brightness, colour, contrast, histogram, white balance and/or other. The image metric differences used in the determination of the per-image second conversion parameter sets may be a result of a comparison of pixel values and/or image metrics in the overlapping regions of the raw format images, image previews/thumbnails or first or second ancillary format images of the subset. Minimizing image-metrics differences preferably comprises minimizing root mean square differences of one or more image metrics.

Once surface color data has been generated, the transformations and blending parameters used can be stored and reused later, for example by storing the second conversion parameter sets for each converted raw format image. If for example values for exposure, contrast, white balance, sharpening, noise suppression, color properties or other parameters should be adjusted later, the textures or orthoimages can be regenerated directly from the raw format images with best possible image quality using adjusted second conversion parameter sets for each raw format image. This texture generation will use the original geometric transforms and image blending parameter values already calculated by the photogrammetry processing and surface color data generation and the per-image second conversion parameter sets and stored for the individual images. This can be used for both user-driven interactive adjustments or for automated processes in e.g., 2D smoothing of image-to-image variance or delighting.

Only parts of an ancillary format image that are needed in the photogrammetry data generation will have to be generated from the raw format image. This can save significant processor, memory, bandwidth, and storage resources. Especially at the color or texture generation step where the geometry of the scene is already established, the algorithms can be based on the position and orientation of the camera for a given image and calculate exactly what parts of the image can be relevant for generating colors or textures for any given part of the geometry. Hence, in an exemplary embodiment, generating a first ancillary format image comprises generating the first ancillary format image from only a first set of pixels from a raw format image. The first set of pixels from which the first ancillary format image is generated may be selected based on image analysis based on an already generated first ancillary format image, and/or the spatial coordinates determined based on an already generated first ancillary format image. Also, in an exemplary embodiment, generating a second ancillary format image comprises generating the second ancillary format image from only a second set of pixels from a raw format image. The first set of pixels may be different from the second set of pixels. The second set of pixels from which the second ancillary format image is generated may be selected based on image analysis based on the first ancillary format image, and/or the spatial coordinates determined based on the first ancillary format image.

To sum up, conversion parameters, such as conversion parameter values, used to convert a raw format image into a first ancillary format image may differ between:

- first and second sets of conversion parameters, such as conversion parameter values, for first and second ancillary format images.
- different first conversion parameter sets, such as conversion parameter value sets, used to generate different first ancillary format images from different raw format images.
- different second conversion parameter sets, such as conversion parameter value sets, used to generate different second ancillary format images from different raw format images.

To following lists conversion parameters, the values of one or more of which may differ:

File and Data Format and Encoding Parameters:

- output image data format for example 1 channel monochrome, 3 channel RGB etc.
- output bit depth for example 8 bit or 16 bit per channel
- output color space for example sRGB, Adobe RGB 1998, ProPhoto RGB etc.
- gamma encoding
- color profile.
- ancillary format image resolution, such as 100% resolution or scaled to a lower resolution such as for example 50%, 25% or another resolution.
- compression, for example uncompressed, lossless compression, JPEG compression, or other.

Image Parameters:

- exposure correction
- white balance
- contrast adjustment
- noise suppression
- sharpening
- clarity
- dynamic range compression such as shadow and highlight recovery.
- curves adjustments such as RGB curves, luminance curve etc.
- parameters to control Bayer interpolation such as quality settings or performance vs quality parameters.

Calibration and Correction Parameters:

- sensor blemish correction
- radiometric calibration
- light falloff or uniformity correction
- geometric correction or lens distortion correction.

Since many potential conversion parameters exists, some of which may not be relevant for the field of generating digital spatial models, it is preferred that at least one conversion parameter typical for the generation of photogrammetric data for digital spatial models be included. Hence, in exemplary embodiments, the first and second sets of conversion parameters comprise at least one or more of:

- resolution conversion parameters;
- bit depth conversion parameters;
- pixel color format, such as monochrome vs RGB; and
- noise suppression parameters.

The present disclosure can advantageously be applied in the field of geomatics, i.e., the collection, distribution, storage, analysis, processing, and presentation of geographic or geospatial data. In such methods for generating a digital geomatic model, generating spatial photogrammetry data comprise generating geospatial photogrammetry data, and the determined spatial coordinates are geospatial coordinates determined using aero triangulation. Images for geomatics are typically captured from one or more cameras on a capture platform on a manned or unmanned aircraft such as an airplane, a helicopter, or a drone. The aircraft may follow a predetermined flight pattern a record images at predetermined times, intervals, or positions. In geomatics, the raw format images may therefore comprise meta data comprising one or more of: relative position of camera and motive during capture, relative orientation of camera and motive during capture, absolute position and/or orientation of the camera at time of capture in relation to a geographic coordinate system, time of capture, exposure time, aperture, ISO, sun angle, image sensor calibration data, camera and lens calibration data, speed of movement and/or rotation of the camera during exposure, meta data from fight plan such as information about flight lines and overlaps with neighboring images etc.

The present disclosure can advantageously be applied for photogrammetric 2D or 2D scanning that do not involve any geographical position references.

The present disclosure can advantageously be applied for photogrammetric 3D model generation in applications without any absolute geographical reference system such as 3D model generation or 3D scanning of the interior of buildings, caves, or other structures.

The present disclosure can advantageously be applied for photogrammetric 3D model generation or 3D scanning that do not involve any absolute geographical reference system such as 3D object scanning using fixed or moving cameras and/or mechanisms to move or rotate the object.

The use of the terms "first", "second", "third" and "fourth", "primary", "secondary", "tertiary" etc. does not imply any particular order but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-3 comprises some circuitries or operations which are illustrated with a solid line and some circuitries or operations which are illustrated with a dashed line. Circuitries or operations which are comprised in a solid line are circuitries or operations which are comprised in the broadest example embodiment. Circuitries or operations which are comprised in a dashed line are example embodiments which may be comprised in, or a part of, or are further circuitries or operations which may be taken in addition to circuitries or operations of the solid line example embodiments. It should be appreciated that these operations need not be performed in order presented. Furthermore, it should be appreciated that not all the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods and devices described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method for operating an electronic device comprising a processor and an interface and being configured to generate a digital spatial model, the method comprising:

accessing, via the interface and/or using the processor, digital raw file format images captured from a plurality of different relative positions and comprising metadata providing the capturing position and orientation, wherein a raw file format image is a digital image file produced by a camera with a digital image sensor, and where the image data in the file corresponds to the light levels captured by each photo site of the image sensor with no demosaicing;

processing, using the processor, the raw file format images for generating spatial photogrammetry data, comprising:

using the processor, generating, first ancillary file format images from the raw file format images using first sets of conversion parameters;

using the processor, determining spatial coordinates by triangulation based on the generated first ancillary file format images;

using the processor, generating second ancillary file format images from the raw file format images using second sets of conversion parameters different from the first sets of conversion parameters; and using the processor, generating surface color data based on the second ancillary file format images;

generating a digital spatial model based on the determined spatial coordinates and the generated surface color data;

wherein one or more of:

the first and second sets of conversion parameters are selected for the first ancillary format images to be generated with one or more of a higher resolution; a lower bit depth; or a lower noise suppression than the second ancillary file format images;

the first sets of conversion parameters are selected to enhance local contrast and details and compress overall dynamic range;

the second sets of conversion parameters are selected to enhance color reproduction and increase dynamic range; or the first and second sets of conversion parameters are different in one or more of the following parameters: bit depth; pixel format, such as, monochrome or RGB; noise suppression; dynamic range compression; image resolution; image quality versus speed of processing setting.

2. The method according to claim 1, comprising generating third ancillary file format images from the raw file format image using a third set of conversion parameters different from the first and second sets of conversion parameters.

3. The method according to claim 1, wherein processing the raw file format images comprises generating first ancillary file format images from the raw file format images using first sets of conversion parameters that are different for different raw file format images.

4. The method according to claim 1, wherein processing the raw file format images comprises generating second ancillary file format images from the raw file format images using second sets of conversion parameters that are different for different raw file format images.

5. The method according to claim 4, wherein the different second sets of conversion parameters used to generate second ancillary file format images from different raw file format images are determined based on data from the first ancillary file format images generated from the corresponding raw file format images.

6. The method according to claim 1, wherein generating second ancillary file format images comprises:

selecting a subset of raw file format images that have overlapping regions; and determining second sets of conversion parameters for the selected subset so that differences in one or more image metrics in corresponding overlapping regions of the second ancillary file format images generated from the subset are smaller than a given threshold or minimized over the subset.

7. The method according to claim 6, wherein the second sets of conversion parameters are determined based on a comparison of pixel values and/or image metrics in the overlapping regions of the raw file format images of the subset.

8. The method according to claim 1, wherein generating second ancillary file format images comprises:

selecting a subset of raw file format images that have overlapping regions; and for a second ancillary file format images generated from the subset and in which an image metric is (such as: selected or adjusted to be) different in separate overlapping regions, determining values of a conversion parameter related to the image metric comprises fitting the values across the image to a continuous function connecting the different image metrics in the separate overlapping regions.

9. The method according to claim 1, wherein, for each raw file format image, the steps of generating the first ancillary file format image from the raw file format image and determining spatial coordinates are performed before the step of generating the second ancillary file format image from the raw file format image.

10. The method according to claim 1, wherein, for a given raw file format image, the steps of generating the first ancillary file format image from said raw file format image and determining spatial coordinates based thereon are performed before the step of generating a first ancillary file format image from a subsequent raw file format image.

11. The method according to claim 1, wherein the steps of generating the first ancillary file format images from the raw file format images and determining spatial coordinates are performed for all raw file format images before the steps of generating the second ancillary file format images from the raw file format images.

12. The method according to claim 1, wherein the first and second sets of conversion parameters comprise at least one or more of:

resolution conversion parameters;
bit depth conversion parameters;
pixel color format; and
noise suppression parameters.

13. An image processing device comprising memory circuitry, processor circuitry, and an interface, wherein the image processing device is configured to perform any of the methods disclosed in claim 1.

* * * * *